(12) United States Patent
Khandekar et al.

(10) Patent No.: US 8,837,273 B2
(45) Date of Patent: Sep. 16, 2014

(54) USING A SINGLE FHT TO DECODE ACCESS-BASED HANDOFF PROBES FROM MULTIPLE USERS

(75) Inventors: Aamod Khandekar, San Diego, CA (US); Alexei Gorokhov, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 13/212,114

(22) Filed: Aug. 17, 2011

(65) Prior Publication Data

US 2012/0063293 A1    Mar. 15, 2012

Related U.S. Application Data

(62) Division of application No. 12/021,961, filed on Jan. 29, 2008, now Pat. No. 8,023,398.

(60) Provisional application No. 60/887,341, filed on Jan. 30, 2007.

(51) Int. Cl.
| | |
|---|---|
| *H04J 11/00* | (2006.01) |
| *H04J 13/00* | (2011.01) |
| *H04W 48/16* | (2009.01) |
| *H04W 36/08* | (2009.01) |
| *H04W 74/08* | (2009.01) |
| *H04B 1/7093* | (2011.01) |

(52) U.S. Cl.
CPC ............ *H04J 13/0048* (2013.01); *H04W 48/16* (2013.01); *H04W 36/08* (2013.01); *H04B 2201/70707* (2013.01); *H04W 74/0833* (2013.01); *H04B 2001/70935* (2013.01)
USPC ............ 370/209; 370/331; 370/338; 370/341

(58) Field of Classification Search
CPC .................................................... H04J 13/0048
USPC ................. 370/208, 209, 328, 335, 338, 329; 455/436
See application file for complete search history.

(56) References Cited

U.S. PATENT DOCUMENTS

| | | | |
|---|---|---|---|
| 5,907,813 A | 5/1999 | Johnson, Jr. et al. | |
| 5,920,551 A * | 7/1999 | Na et al. ......................... | 370/335 |
| 6,075,989 A * | 6/2000 | Moore et al. ................... | 455/436 |

(Continued)

FOREIGN PATENT DOCUMENTS

| | | |
|---|---|---|
| JP | 2001168765 A | 6/2001 |
| JP | 2001511619 A | 8/2001 |

(Continued)

OTHER PUBLICATIONS

Beery, Yair, Optimal Soft Decision Block Decoders Based on Fast Hadamard Transform, IEEE Transactions on Information Theory, May 1986, vol. 32, No. 3, pp. 355-364.

(Continued)

*Primary Examiner* — Brian D Nguyen
*Assistant Examiner* — Toan Nguyen
(74) *Attorney, Agent, or Firm* — Mary A. Fales

(57) ABSTRACT

A method includes scrambling a Walsh sequence with a random sequence to produce a scrambled Walsh sequence. The method also includes transmitting the scrambled Walsh sequence as an access-based handoff probe.

20 Claims, 13 Drawing Sheets

(56) References Cited

U.S. PATENT DOCUMENTS

| | | | |
|---|---|---|---|
| 6,084,904 | A | 7/2000 | Wang et al. |
| 6,320,853 | B1* | 11/2001 | Wong et al. .................. 370/328 |
| 6,693,888 | B2* | 2/2004 | Cafarelli et al. ............. 370/338 |
| 6,973,062 | B1 | 12/2005 | Han |
| 7,046,647 | B2 | 5/2006 | Oba et al. |
| 7,149,521 | B2 | 12/2006 | Sundar et al. |
| 7,164,915 | B2 | 1/2007 | Zaki |
| 7,173,900 | B1 | 2/2007 | Sundararajan |
| 7,280,466 | B2* | 10/2007 | Tong et al. .................... 370/208 |
| 7,289,472 | B2 | 10/2007 | Yano et al. |
| 8,023,398 | B2 | 9/2011 | Khandekar et al. |
| 2003/0179733 | A1* | 9/2003 | Yano ............................ 370/335 |
| 2005/0088988 | A1 | 4/2005 | Kwon et al. |
| 2005/0174966 | A1* | 8/2005 | Lansford et al. ............. 370/329 |
| 2007/0010246 | A1 | 1/2007 | Churan |
| 2008/0089282 | A1 | 4/2008 | Malladi et al. |

FOREIGN PATENT DOCUMENTS

| | | |
|---|---|---|
| JP | 2002529002 A | 9/2002 |
| JP | 2003179522 A | 6/2003 |
| JP | 2007019799 A | 1/2007 |
| WO | WO9925080 | 5/1999 |
| WO | WO03017621 | 2/2003 |

OTHER PUBLICATIONS

International Search Report—PCT/US08/052505, International Search Authority-European Patent Office—Aug. 7, 2008.

Taiwan Search Report—TW097103833—TIPO—Jul. 28, 2011.

Written Opinion—PCT/US08/052505, International Search Authority—European Patent Office—Aug. 7, 2008.

* cited by examiner

USING A SINGLE FHT TO DECODE ACCESS-BASED HANDOFF PROBES FROM MULTIPLE USERS

I. CLAIM OF PRIORITY

This application is a divisional application of U.S. application Ser. No. 12/021,961, filed Jan. 29, 2008, now U.S. Pat. No. 8,023,398,entitled "USING A SINGLE FHT TO DECODE ACCESS-BASED HANDOFF PROBES FROM MULTIPLE USERS," which claims the benefit of U.S. Provisional Application No. 60/887,341, filed Jan. 30, 2007, entitled "METHOD AND APPARATUS FOR USING A ACCESS CHANNEL MAC PROTOCOL."

II. FIELD

The following description relates generally to wireless communications and more particularly to access-based handoff probes.

III. DESCRIPTION OF RELATED ART

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link may be established though a single-in-single-out, multiple-in-single-out, or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and a frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

When a device desires to access a sector covered by one or more base stations, the device transmits an access probe. The access probe generally includes a terminal specific random sequence. Thus, two terminals sending access probes in most cases have chosen different random sequences. The receiving access point needs to demodulate the access probes with the different random sequences, which increases complexity and can create delays when granting access.

IV. SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with using a single Fast Hadamard Transform (FHT) to demodulate access-based handoff probes from multiple users.

In a particular embodiment, a method includes scrambling a Walsh sequence with a random sequence to produce a scrambled Walsh sequence and transmitting the scrambled Walsh sequence as an access-based handoff probe.

In another particular embodiment, a wireless communication apparatus includes a transmitter and a processor configured to scramble a Walsh sequence with a random sequence to produce the scrambled Walsh sequence. The processor is further configured to cause a transmitter to transmit the scrambled Walsh sequence as an access-based handoff probe.

In another particular embodiment, an apparatus includes means for scrambling a Walsh sequence with a random sequence to produce a scrambled Walsh sequence and means for transmitting the scrambled Walsh sequence as an access-based handoff probe.

In another particular embodiment, a non-transitory computer-readable medium includes instructions that, when executed by a processor, cause the processor to scramble a Walsh sequence with a random sequence to produce a scrambled Walsh sequence. The instructions further cause the processor to cause a transmitter to transmit the scrambled Walsh sequence as an access-based handoff probe.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

V. BRIEF DESCRIPTION OF THE DRAWINGS

VI. DETAILED DESCRIPTION

Figure 1:
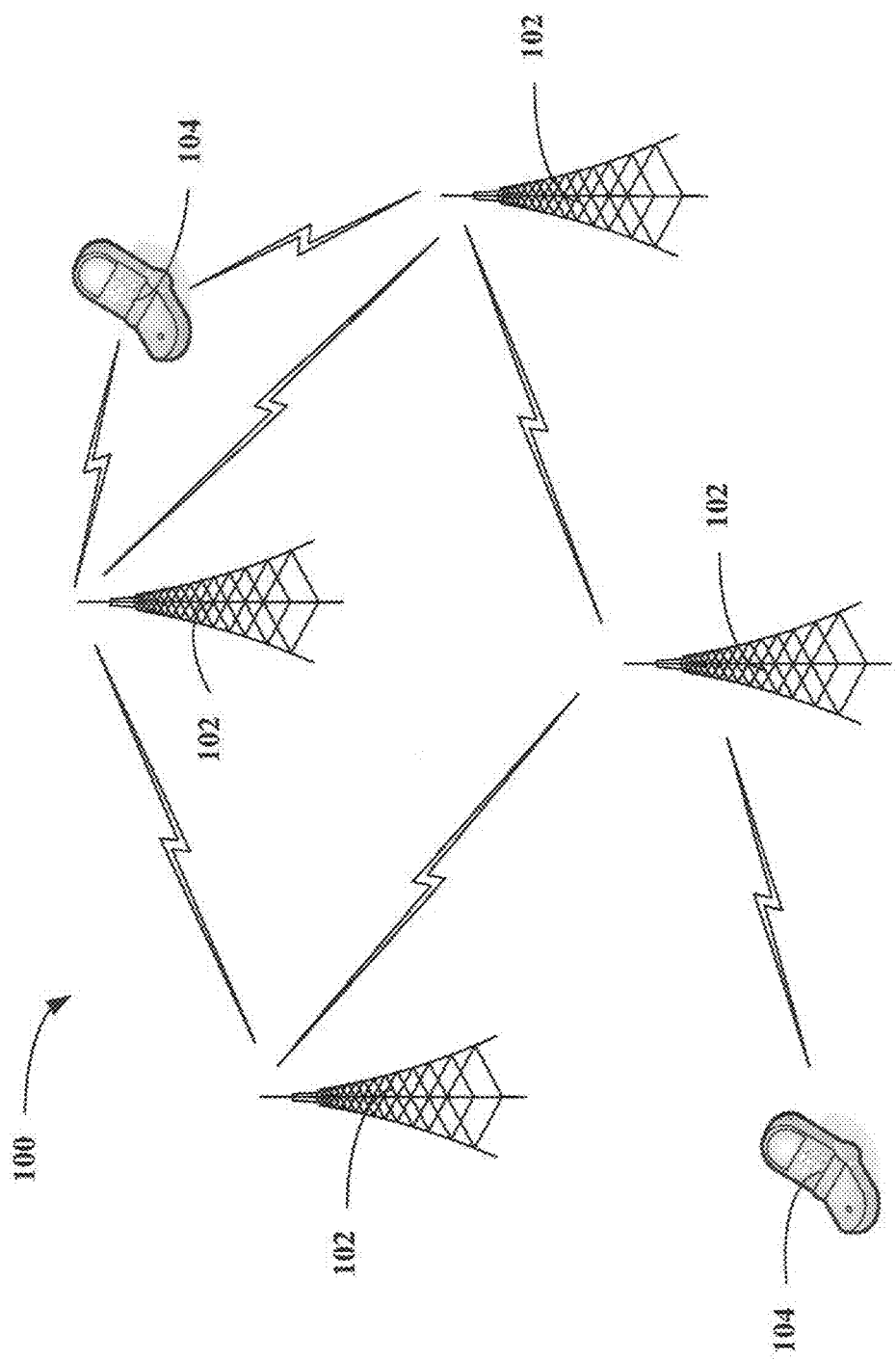
FIG. 1 illustrates a wireless communication system in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal. A wireless terminal can also be called a system, subscriber unit, subscriber station, mobile station, mobile, mobile device, device remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, and/or another processing device for communicating over a wireless system. Moreover, various aspects are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 in accordance with various aspects presented herein is illustrated. System 100 can comprise one or more base stations 102 in one or more sectors that receive, transmit, repeat, etc., wireless communication signals to each other and/or to one or more mobile devices 104. Each base station 102 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, etc.). Each mobile device 104 can comprise one or more transmitter chains and receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

When a mobile device 104 desires to gain access to system 100, the mobile device 104 transmits, and the access network (e.g., base station 102) receives, an Access Probe. The access probe can be used for initial access or the access probe can be used for handoff within an Active Set, which is a list of base stations with which the mobile device 104 is in communication. The access network (e.g., base station 102) can respond to an access probe with an Access Grant, which can be communicated over a Shared Signaling MAC Protocol, for example. The access probe can be transmitted on a CDMA segment, which is a certain part of bandwidth that is set aside for transmission of CDMA sequences. The CDMA sequences can include access probes, CQI transmissions, request transmissions, and so forth.

The disclosed aspects relate to utilizing a Fast Hadamard Transform (FHT) that is common to multiple mobile devices 104. Utilizing a common FHT can mitigate the complexity associated with conventional systems that utilize a different FHT for each terminal. Thus, a terminal specific random sequence has been commonly utilized and the base station had to search for each terminal separately, which consumes system resources. Through the utilization of a common FHT in accordance with the disclosed aspects, the complexity involved during access requests and access grants can be mitigated.

Figure 2:
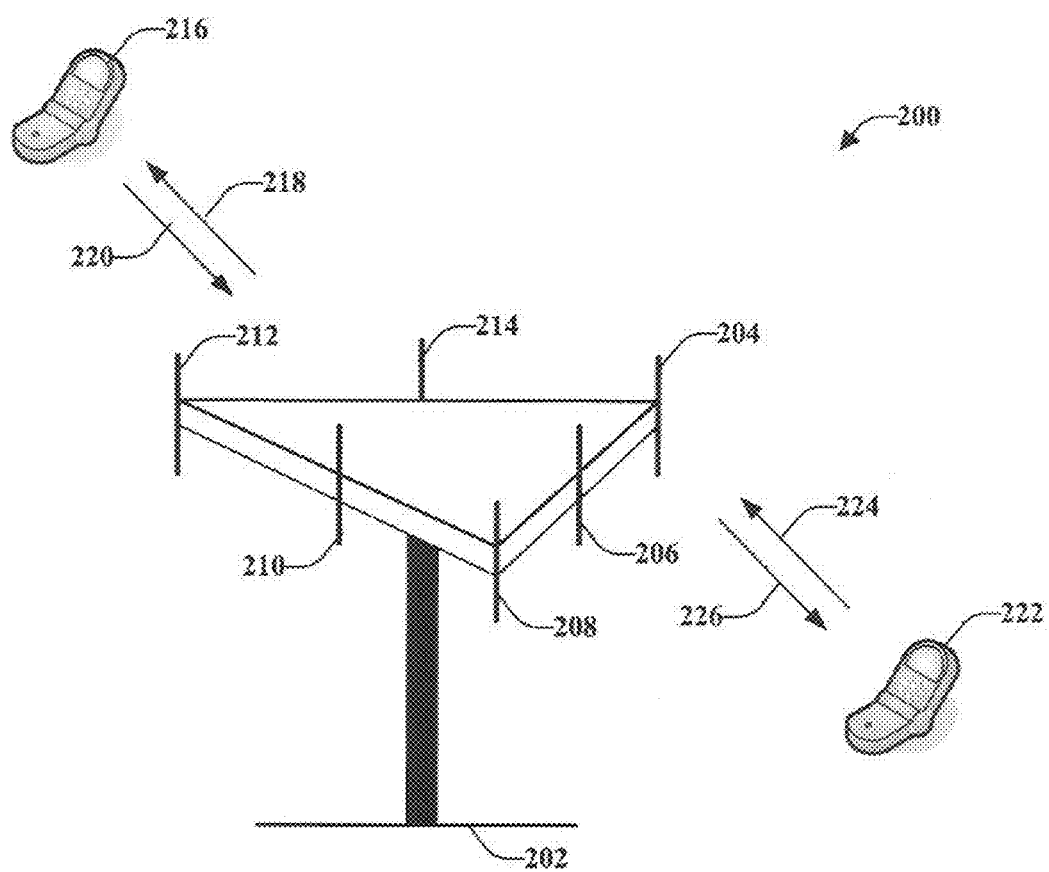
FIG. 2 illustrates a multiple access wireless communication system according to one or more aspects.

Referring now to FIG. 2, a multiple access wireless communication system 200 according to one or more aspects is illustrated. A wireless communication system 200 can include one or more base stations in contact with one or more user devices. Each base station provides coverage for a plurality of sectors. A three-sector base station 202 includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 218 and receive information from mobile device 216 over reverse link 220. Forward link (or downlink) refers to the communication link from the base stations to mobile devices, and the reverse link (or uplink) refers to the communication link from mobile devices to the base stations. Mobile device 222 is in communication with antennas 204 and 206, where antennas 204 and 206 transmit information to mobile device 222 over forward link 226 and receive information from mobile device 222 over reverse link 224.

Each group of antennas and/or the area in which they are designated to communicate may be referred to as a sector of base station 202. In one or more aspects, antenna groups each are designed to communicate to mobile devices in a sector or the areas covered by base station 202. A base station may be a fixed station used for communicating with the terminals.

There are two types of access transmissions when a mobile device 216, 222 desires to establish communication with a base station 202. The first transmission type is initial access, which is utilized by terminals that desire to gain access to system 200. The second transmission type is access-based handoff, which involves mobile devices 216, 222 that were connected to a first sector or base station 202 and desire handoff to another sector or base station. In access-based handoff, the mobile device has already communicated with the sector to which handoff is to occur, thus, that sector, in most cases, has already assigned a MAC ID (Medium Access Control Identification) to the mobile device. Thus, when requesting access-based handoff, the mobile device can transmit the access probe scrambled with its own MAC ID. Through utilization of a single FHT for multiple devices as disclosed herein, the identification of the mobile devices (and granting access) by the network can be quicker and can be performed with less complexity.

Figure 3:
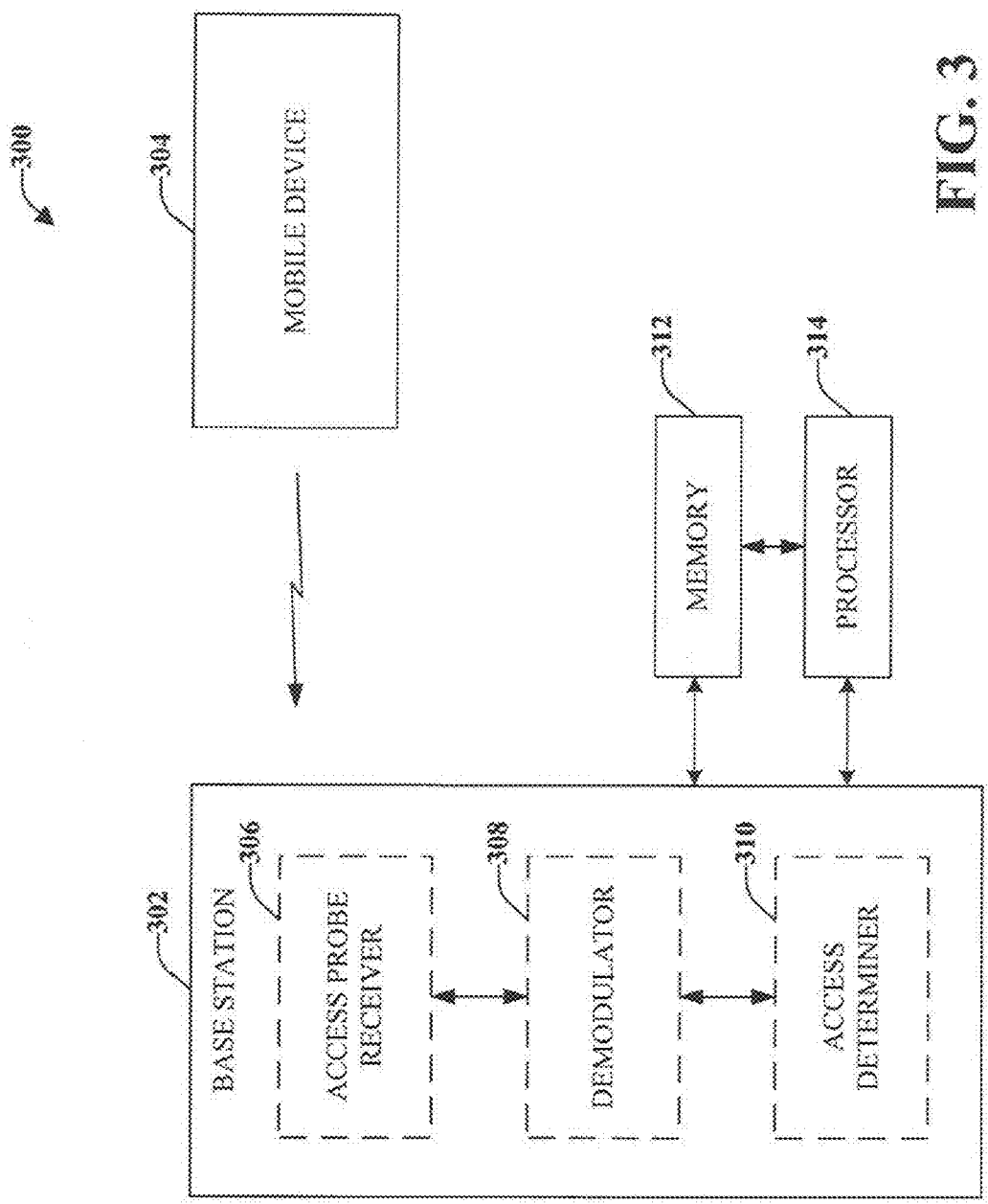
FIG. 3 illustrates a system that utilizes a single FHT to process an access-based handoff probe.

FIG. 3 illustrates a system 300 that utilizes a single FHT to process an access-based handoff probe. When a mobile device desires access to a network (e.g., initial access, handoff within an active set), the mobile device sends an access probe. The access network can respond with an Access Grant, if access to that network is allowed. System 300 can facilitate utilization of a single FHT for access probes transmitted by multiple devices during access-based handoff.

System 300 includes a base station 302 in wireless communication with a mobile device 304. Although a number of mobile devices(s) 304 and base stations(s) 302 can be included in an access network, as will be appreciated, a mobile device 304 that transmits communication data signals to a single base station 302 is illustrated for purposes of simplicity.

As discussed, initial handoff occurs when a mobile device has not been assigned a MAC ID and chooses a random sequence in order to access a network. This random sequence can be chosen from a set of 1,024 random sequences. These 1,024 random sequences are based on a CDMA segment that has a dimension of 8 OFDM symbols (time) and 112 subcarriers (frequency), resulting in 1,024 modulation symbols.

For access-based handoff, each mobile device (e.g., MAC ID) is assigned any number of sequences. In one example, a device is assigned one to three sequences, however, the disclosed aspects are not to be limited to any particular number of assigned sequences. The sequences, such as 1,024 sequences, are processed by a Walsh function, resulting in 1,024 Walsh sequences. These 1,024 Walsh sequences are scrambled by a FHT. Each of the sequences appears to be a random sequence because it is a Walsh sequence scrambled by a random sequence. Since there can be any number of sequences assigned to each user, there might be situations when more than one FHT has to be performed in order to accommodate all mobile devices in the network. A different random sequence can be utilized for each FHT.

For example, if there are twenty mobile devices in a network, a single FHT can be utilized. From the first 1,024 sequences, a first mobile device is assigned subsequences 0, 1, and 2. A second mobile device is assigned subsequences 3, 4, and 5. A third mobile device is assigned subsequences 6, 7, 8, and so forth. It should be understood that the assignment of three sequences to each device in the previous example is for explanation purposes only and in accordance with the disclosed aspects, any number of sequences can be assigned to each device. In a situation where there are 512 mobile devices, for example, two FHTs might be utilized if more than one sequence is assigned to any single device. If there are 1,000 mobile devices, then three FHTs can be utilized, and so on.

In further detail, the various aspects disclosed herein relate to a WalshSequenceID and an AccessScramblingID. The WalshSequenceID is an integer in the range $0 \leq \text{WalshSequenceID} < N_{ACMPWalshSequences}$. The $N_{ACMPWalshSequences}$ is a constant that denotes the number of Walsh sequences in a single FHT. In the case of Ultra Mobile Broadband (UMB), $N_{ACMPWalshSequence}$ is equal to 1,024. The AccessScramblingID identifies the sequence that is utilized to scramble the Walsh sequence. Its range is determined by the number of MAC IDs and the number of sequences per MAC ID. In accordance with an aspect, the AccessScramblingID is an integer between 0 and 15, however, other ranges can be utilized. The WalshSequenceID denotes the index of the Walsh sequence (within a single FHT) while the AccessScramblingID denotes the index of the scrambling sequence itself. The quantities WalshSequenceID and AccessScramblingID have a one-to-one relationship with the AccessSequenceID and the AccessType Fields. The AccessType denotes the type of handoff (=0 indicates initial access or idle state and =1 indicates access-based handoff, or connected state). AccessSequenceID denotes the index of the access sequence within the set available to the terminal. Thus, for access-based handoff, if the terminal chooses from one of three sequences, for example, AccessSequenceID takes values from 0 to 2.

Determining the WalshSequenceID and AccessScramblingID can depend on whether an Idle State Protocol is in the Access State. Access probe transmission in the Access State of the Idle State Protocol can be utilized to transition to a Connected State, which can be referred to as "initial access". Access probe transmission outside the Access State of the Idle State Protocol can be utilized for "hard" handoff between different sectors, either on the same frequency or on different frequencies. Access probe transmission outside the Access State of the Idle State Protocol can also be used to transition to a Connected State from a Semi-Connected State and/or to obtain timing and power correction for a sector.

In connected stated (AccessType=1), AccessSequenceID takes values between 0 and PilotLevel−1, depending on the forward link channel quality of the sector. In some cases, AccessSequenceID may also depend on other quantities such as the priority level or the desired QoS of the terminal.

Base station 302 includes an access probe receiver 306 that can be configured to accept access probes from devices 304 that desire to gain access to the sector served by base station 302. The access probe can include a Walsh Sequence, which can be scrambled by the mobile device 304 through use of a specified random sequence. The random sequence can be previously communicated to devices within the sector so that the various devices utilize the same random sequence for a particular interval (e.g., 5 ms). In accordance with some aspects, the Walsh Sequence comprises 1,024 modulation symbols.

In accordance with some aspects, a first subset of mobile devices in the sector (or that desire to gain access to the sector) use a first random sequence and a second subset of mobile devices utilize a second random sequence. The different random sequences might be a function of when the devices transmitted the access probe and/or based on the number of devices that might transmit an access probe at any time since only a finite number of devices can be provided sub-sequences of the scrambled sequence (e.g., first device assigned subsequences 0, 1, and 2 and second device assigned subsequences 3, 4, and 5).

Base station 302 can also include a demodulator 308 that can be configured to demodulate the Walsh Sequence included in the access probe with a FHT, utilizing the random sequence (or more than one random sequence depending on a current system 300 configuration). In the case where multiple access probes are received at substantially the same time, demodulator 308 can be configured to demodulate the access probes through utilization of a single FHT (e.g., single random sequence).

An access determiner 310 can selectively Grant access to the sector (e.g., base station 302) based on the demodulation as well as other factors (e.g., system capacity, signal strength, and so forth). The Access Grant can be transmitted over a Shared Signaling MAC Protocol.

System 300 can include memory 312 operatively coupled to base station 302. Memory 312 can store information related to identifying a single FHT or random sequence utilized by devices to transmit an access probe, demodulating an access probe based on one or more known random sequences, selectively transmitting a Grant Access if access to the sector is approved, and other suitable information related to signals transmitted and received in a communication network. A processor 314 can be operatively connected to base station 302 (and/or memory 312) to facilitate analysis of information related to a single FHT to decode access-based handoff probes from multiple users in a communication network. Processor 314 can be a processor dedicated to analyzing and/or generating information received by base station 302, a processor that controls one or more components of system 300, and/or a processor that both analyzes and generates information received by base station 302 and controls one or more components of system 300.

Memory 312 can store protocols associated with FHT information, taking action to control communication between base station 302 and mobile device 304, etc., such that system 300 can employ stored protocols and/or algorithms to achieve improved communications in a wireless network as described herein. Memory 312 and processor 314 may be located inside or outside of base station 302. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 312 of the disclosed aspects are intended to comprise, without being limited to, these and other suitable types of memory.

Figure 4:
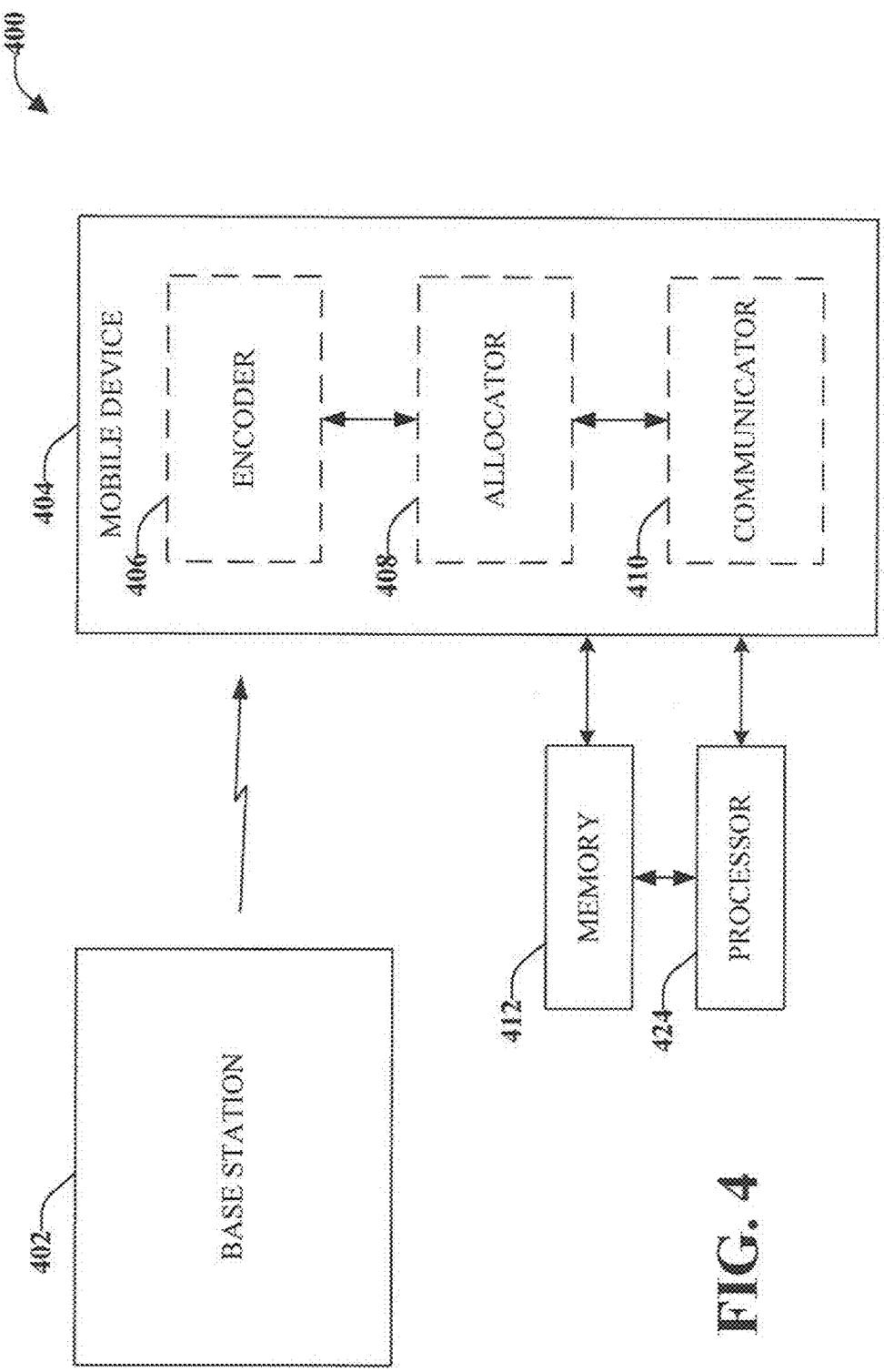
FIG. 4 illustrates a system for utilizing a single Fast Hadamard Transform for access-based handoff probes.

FIG. 4 illustrates a system 400 for utilizing a single Fast Hadamard Transform for access-based handoff probes. System 400 includes one or more base stations 402 in communication with one or more mobile devices 404. From time to time, a mobile device 404 might desire to gain access to a sector served by a base station 402.

In order to gain access, the mobile device 404 can include an encoder 406 that can be configured to scramble a Walsh Sequence with a random sequence to produce a scrambled sequence. The set of Walsh sequences can comprise 1,024 modulation symbols. The encoder 406 can be provided with the random sequence that should be utilized to transmit an access-based handoff probe. Utilizing a defined random sequence provides efficiency since a single FHT can be utilized to decode the sequence.

An allocator 408 can be configured to receive an assignment of sub-sequences of the scrambled sequence. For example, a first device can be assigned sub-sequences 0, 1, and 2, a second device assigned sub-sequences 3, 4, and 5, and so forth. In such a manner, at least a sub-set of devices utilize a common random sequence, which can be demodulated by base station 402 through utilization of a single FHT. One or more of the assigned sub-sequences are utilized to transmit the access-based handoff probe. Thus, there might be situations where a first set of devices utilize a first random sequence and a second set of devices utilizes a second random sequence (e.g., there are more sub-sequences that need to be assigned than sub-sequences available in the random sequence and, thus, a second random sequence is utilized).

Also included is a communicator 410 that can be configured to send the scrambled sequence as an access-based handoff probe. In response to the access-based handoff probe, an Access Grant can be received over a Shared Signaling MAC Protocol.

In accordance with some aspects, mobile device 404 can include a PilotLevel Selector (not shown) that can be configured to determine a PilotLevel. The PilotLevel can be utilized when determining values of a WalshSequenceID and/or an Access ScramblingID.

Further, system 400 can include memory 412 operatively coupled to mobile device 404. Memory 412 can store information related to a random sequence, a value of a Walsh Sequence, a value of a Pilot Level, a value of an AccessScramblingID, transmitting an access-based handoff probe, and other suitable information related to signals transmitted and received in a communication network. A processor 424 can be operatively connected to mobile device 404 (and/or memory 412) to facilitate analysis of information related to using a single FHT for access-based handoff probes in a communication network. Memory 412 and processor 424 can be located inside or outside of mobile device 404. For example, memory 412 may be a memory card that could be inserted into mobile device 404 or a RAM located inside of mobile device 404. Processor 424 can be a processor dedicated to analyzing and/or generating information received by mobile device 404, a processor that controls one or more components of system 400, and/or a processor that both analyzes and generates information received by mobile device 404 and controls one or more components of system 400.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, or component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
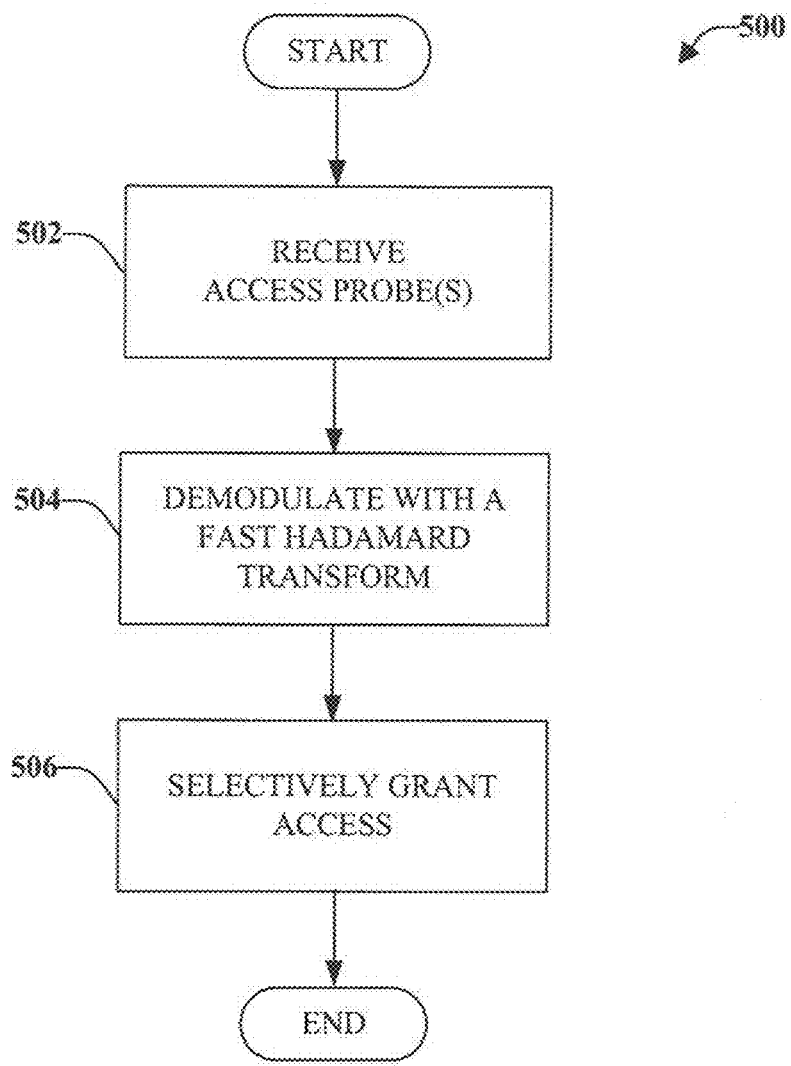
FIG. 5 illustrates a method for using a single Fast Hadamard Transform for access-based handoff probes.

FIG. 5 illustrates a method 500 for using a single Fast Hadamard Transform for access-based handoff probes. At 502, an access probe is received from a mobile device that desires to be granted access to a sector served by a base station. The access probe can include a Walsh Sequence, which, in accordance to some aspects, can comprise 1,024 modulation symbols.

At 504, the Walsh Sequence can be demodulated with a Fast Hadamard Transform that comprises a random sequence that is common to at least a subset of mobile devices. Additionally, access probes can be received from two or more devices at substantially the same time. The two or more access probes can be demodulated utilizing a single FHT. In accordance with some aspects, a second subset of mobile devices can utilize a second random sequence. This second random sequence can be utilized to demodulate the Walsh Sequence (e.g., single FHT).

The mobile device that sent the access probe can be selectively granted access to the sector, at 506. This can include transmitting an Access Grant over a Shared Signaling MAC Protocol.

Figure 6:
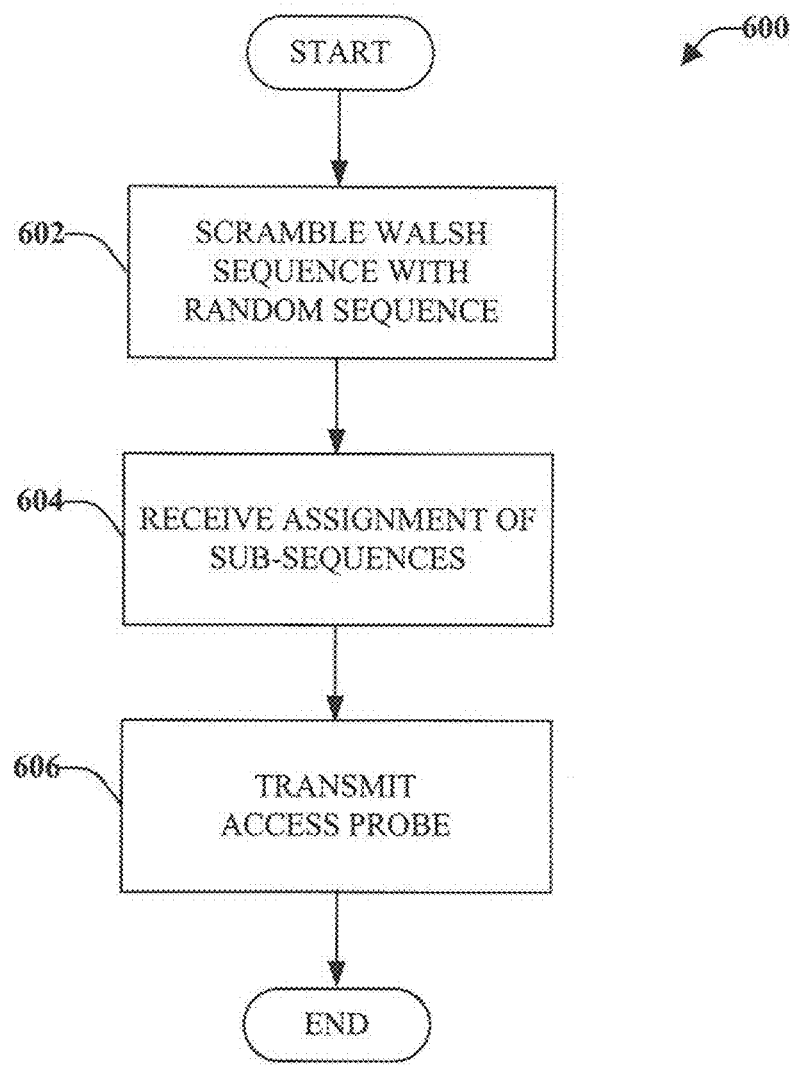
FIG. 6 illustrates another method for using a single FHT to Grant Access.

FIG. 6 illustrates another method 600 for using a single FHT to Grant Access. Method 600 starts, at 602, when a Walsh Sequence is scrambled with a random sequence to produce a scrambled sequence. The random sequence can be utilized by more than one device in order for a single FHT to be utilized with demodulating the scrambled sequence.

At 604, an assignment of one or more sub-sequences of the scrambled sequence is received. The scrambled sequence can be transmitted, at 606, in the form of an access-based handoff probe. One or more of the sub-sequences can be utilized within the access-based handoff probe. If access is granted, an Access Grant can be received over a Shared Signaling MAC Protocol.

Figure 7:
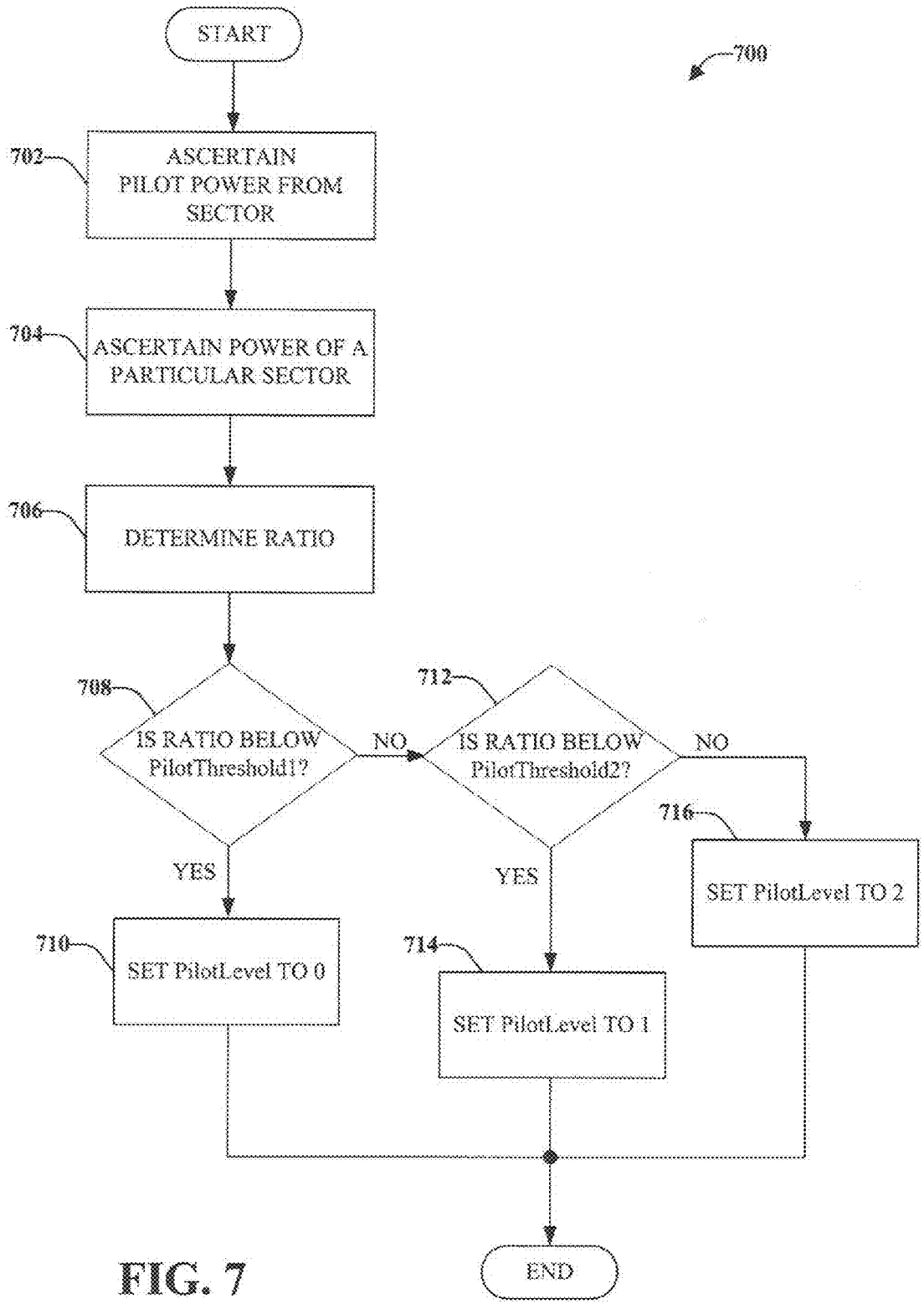
FIG. 7 illustrates a method for determining a PilotLevel.

FIG. 7 illustrates a method 700 for determining a PilotLevel. The quantity PilotLevel is utilized for the values of WalshSequenceID and Access Scrambling ID, as discussed above. In order to determine the PilotLevel, both PilotThreshold1 and Pilot Threshold2 are utilized. Method 700 starts, at 702, when the pilot power from the sector to where an access attempt is being made is ascertained. Various channels can be utilized to determine the received power these channels can include F-OSICH (Other Sector Interference Indication), F-PBCCH (Packet Broadcast Control Channel), F-PPICH (Preamble Pilot Channel) and/or F-SBCCH (Secondary Broadcast Control Channel). For example, the F-OSICH pilot power is the received power of the F-OSICH (e.g., OFDM symbols with indices 4 and 5 from a superframe preamble). The determination of the pilot power can be based on a measurement or through other means of gathering the information. At 704, the power of a given sector is ascertained (e.g., through measuring the power or obtaining in other manners).

A superframe is the fundamental unit of transmission on both forward and reverse links. A forward link superframe consists of a superframe preamble followed by $N_{FLPHYFrames}$ FL PHY Frames. A reverse link superframe consists of $N_{RLPHYFrames}$ RL PHY Frames. In accordance with some aspects, $N_{FLPHYFrames}$ and $N_{RLPHYFrames}$ can be constants in the system and $N_{FLPHYFrames}=N_{RLPHYFrames}=25$. Each superframe can be uniquely identified by a superframe index that is incremented every superframe. The superframe index is related to the system time. Furthermore, each FL PHY Frame and each RL PHY Frame can be uniquely identified by an FL PHY Frame index and an RL PHY Frame index respectively.

At 706, the ratio of the pilot power from the sector to where an access attempt is being made and the total power received in the channel time slot is determined. This ratio can be measured in dB. Based on the ratio, a determination is made, at 708, whether the ratio is below PilotThreshold1. If the determination is that the ratio is below PilotThreshold1 ("YES"), method 700 continues, at 710, and the PilotLevel is set to 0. If the determination is that the ratio is above PilotThreshold1 ("NO"), a determination is made, at 712, whether the ratio is below PilotThreshold2. If the ratio is above PilotThreshold1 and below PilotThreshold2 ("YES"), at 714, the PilotLevel is set to 1. If the ratio is below neither PilotThreshold1 nor PilotThreshold2 ("NO"), method 700 continues, at 716, and the PilotLevel is set to 2.

Thus, as discussed above, to determine the PilotLevel, the access terminal can utilize PilotThreshold1 and PilotThreshold2. The values of WalshSequenceID and AccessScramblingID utilize, as one parameter, the value of the quantity PilotLevel.

Figure 8:
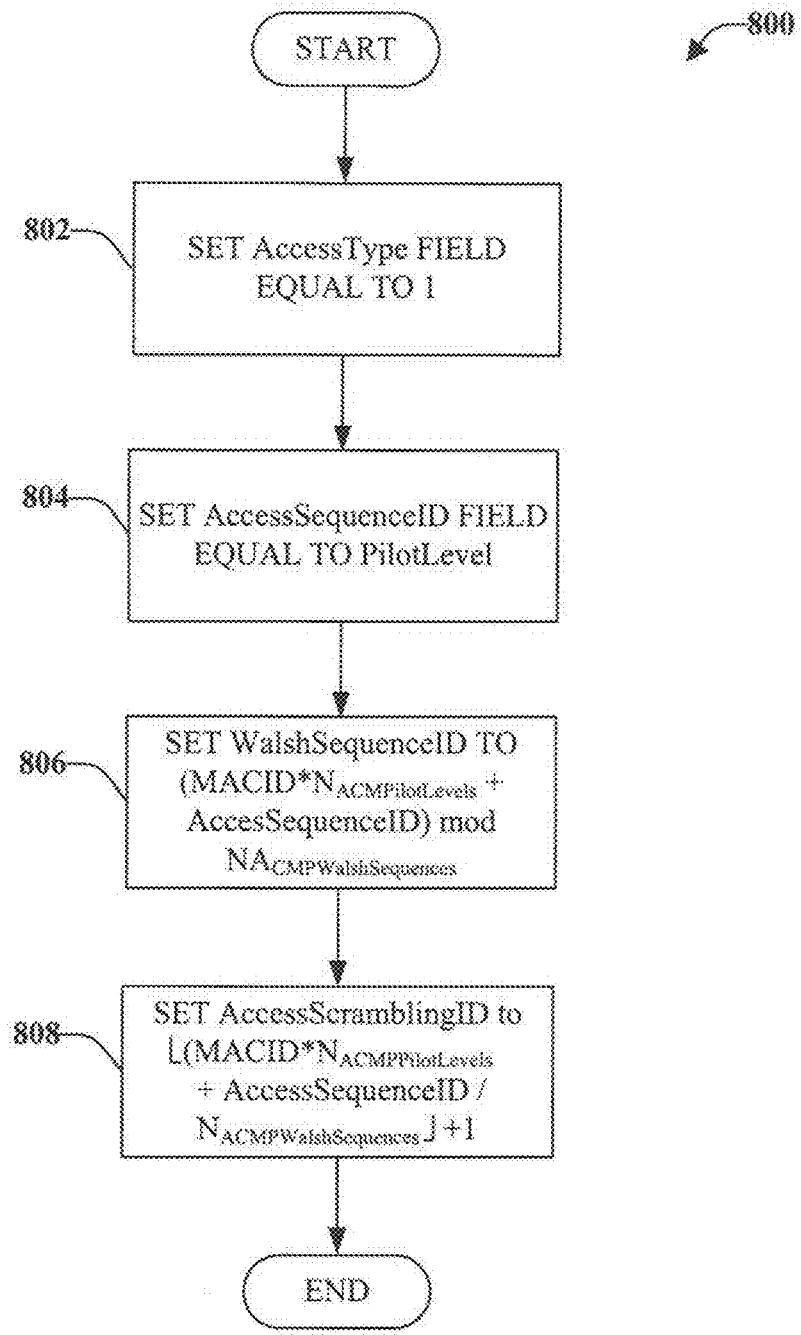
FIG. 8 illustrates a method for Determining WalshSequenceID and Access ScramblingID outside Access State.

FIG. 8 illustrates a method 800 for Determining WalshSequenceID and AccessScramblingID outside Access State. At 802, the AccessType field is set equal to 1. At 804, the AccessSequenceID field is set equal to the PilotLevel. The PilotLevel can be determined in a manner similar to that described in method 700 of FIG. 7.

The WalshSequenceID and the AccessScramblingID can depend on the MAC ID of the access terminal from the target sector of the access probe. The WalshSequenceID can be set, at 806, to (MACID*$N_{ACMPPilotLevels}$+AccessSequenceID) mod $N_{ACMPWalshSequences}$. The AccessScramblingID can be set, at 808, to $\lfloor$(MACID*$N_{ACMPPilotLevels}$+AccessSequenceID/$N_{ACMPWalshSequences}\rfloor$+1.

Figure 9:
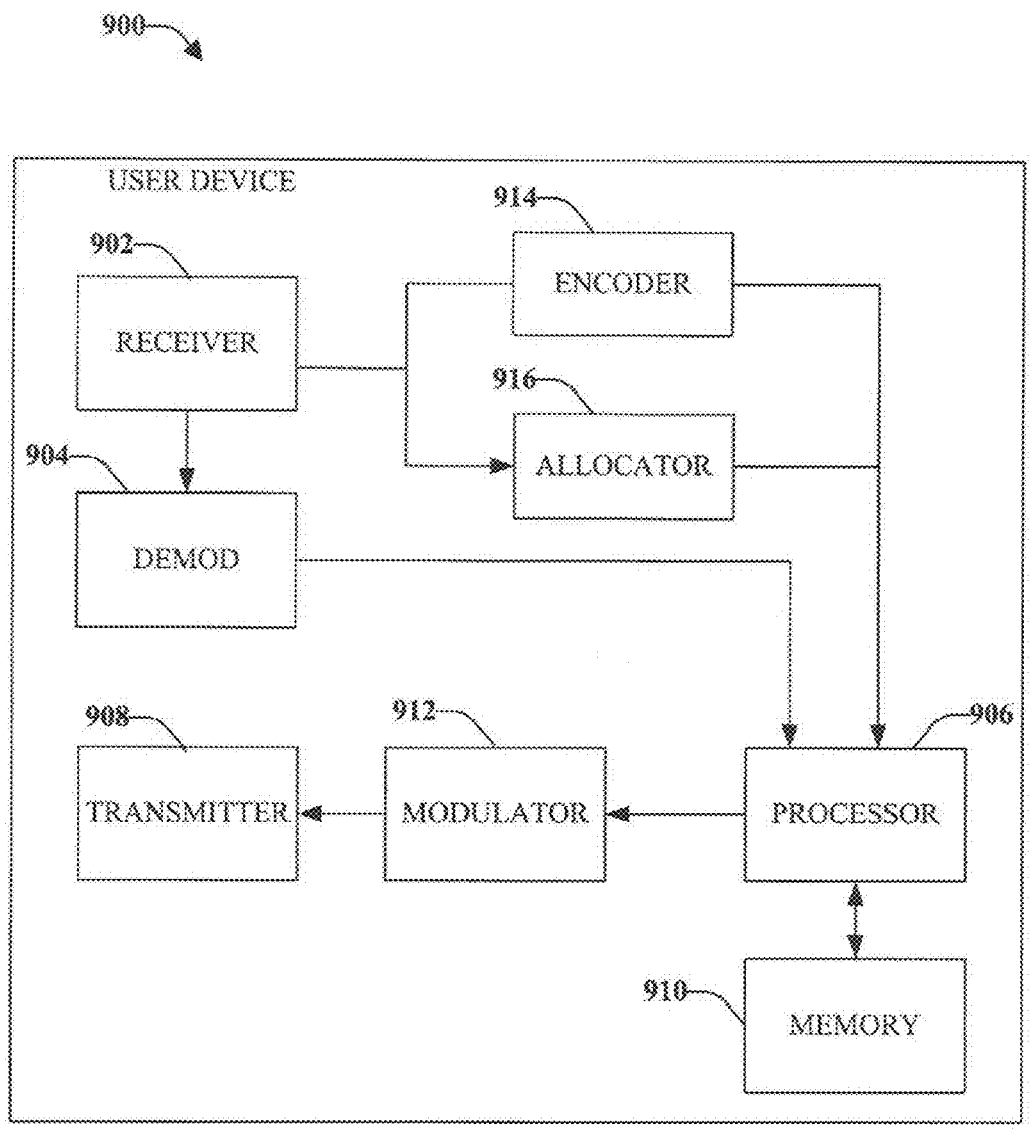
FIG. 9 illustrates a system that facilitates utilizing a single FHT for access probes in accordance with one or more of the disclosed aspects.

With reference now to FIG. 9, illustrated is a user device 900 that facilitates utilizing a single FHT for access probes in accordance with one or more of the disclosed aspects. User device 900 comprises a receiver 902 that can receive a signal from, for example, a receiver antenna. The receiver 902 can perform typical actions thereon, such as filtering, amplifying, downconverting, etc. the received signal. The receiver 902 can also digitize the conditioned signal to obtain samples. A demodulator 904 can obtain received symbols for each symbol period, as well as provide received symbols to a processor 906.

Processor 906 can be a processor dedicated to analyzing information received by receiver component 902 and/or generating information for transmission by a transmitter 908. In addition or alternatively, processor 906 can control one or more components of user device 900, analyze information received by receiver 902, generate information for transmission by transmitter 908, and/or control one or more components of user device 900. Processor 906 may include a controller component capable of coordinating communications with additional user devices.

User device 900 can additionally comprise memory 908 operatively coupled to processor 906 and that can store information related to coordinating communications and any other suitable information. Memory 910 can additionally store protocols associated with sample rearrangement. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and/or methods is intended to comprise, without being limited to, these and any other suitable types of memory. User device 900 can further comprise a symbol modulator 912 and a transmitter 908 that transmits the modulated signal.

Receiver 902 is further operatively coupled to an encoder 914 that scrambles a Walsh Sequence with a random sequence to produce a scrambled sequence. The encoder 914 can be provided with the random sequence so that a single FHT can be utilized to decode the sequence. Additionally, receiver 902 can be operatively coupled to an allocator 916 that receive an assignment of one or more sub-sequences of the scrambled sequence. The transmitter 908 can send the scrambled sequence as an access-based handoff probe. In response to the access probe, receiver 902 can receive an Access Grant, which can be transmitted over a Shared Signaling MAC Protocol.

Figure 10:
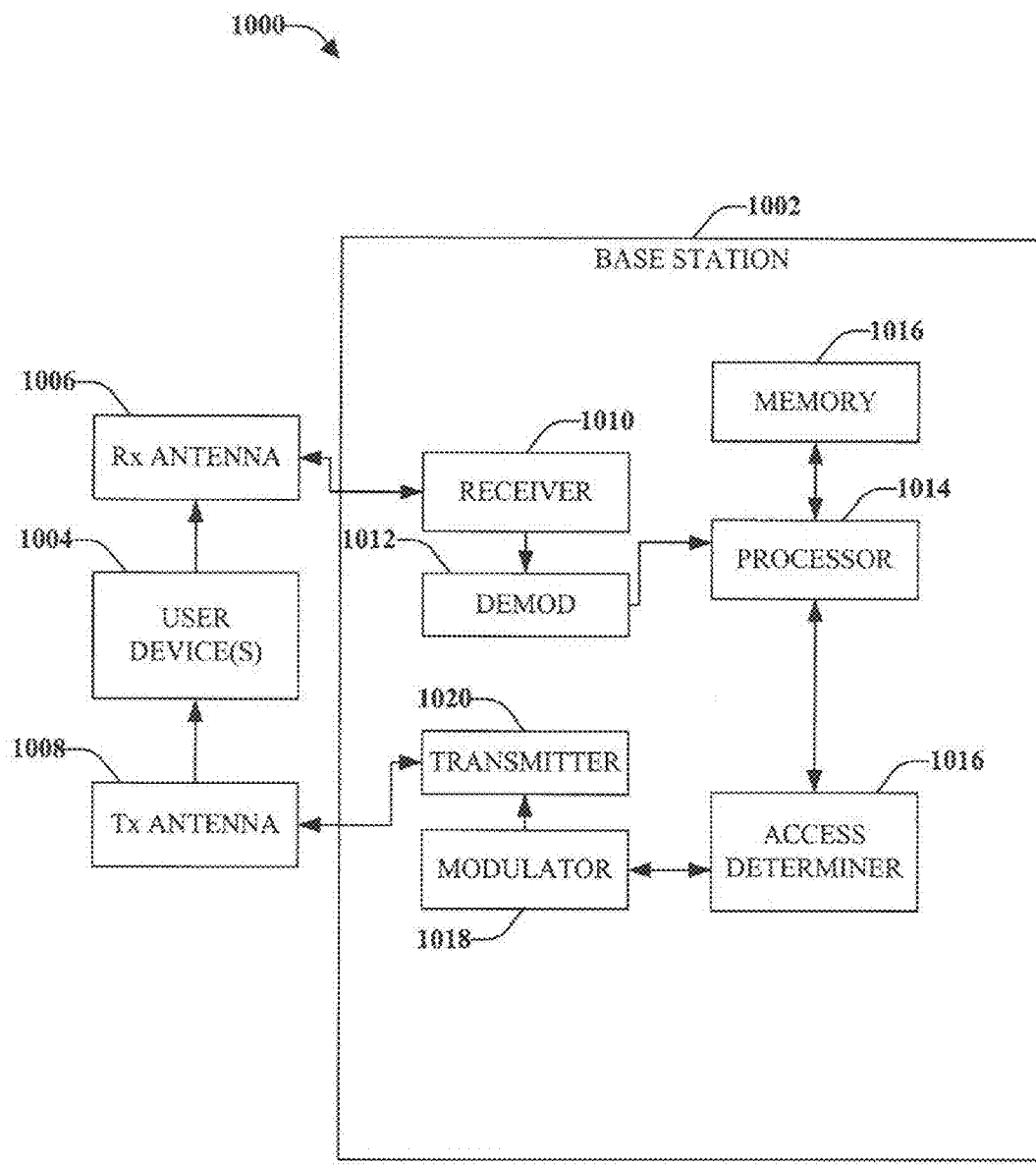
FIG. 10 illustrates of a system that facilitates utilizing a single FHT in accordance with various aspects presented herein.

FIG. 10 is an illustration of a system 1000 that facilitates utilizing a single FHT in accordance with various aspects presented herein. System 1000 comprises a base station or access point 1002. As illustrated, base station 1002 receives signal(s) from one or more user devices 1004 by a receive antenna 1006, and transmits to the one or more user devices 1004 through a transmit antenna 1008.

Base station 1002 comprises a receiver 1010 that receives information from receive antenna 1006 and is operatively associated with a demodulator 1012 that demodulates received information. Demodulated symbols are analyzed by a processor 1014 that is coupled to a memory 1016 that stores information related to broadcast-multicast waveforms embedded in a unicast waveform. A modulator 1018 can multiplex the signal for transmission by a transmitter 1020 through transmit antenna 1008 to user devices 1004.

Processor 1014 is further coupled to an access determiner 1016. Receiver 1010 can receive an access probe from one or more mobile devices that desire to gain access to a sector served by base station 1002. Demodulator 1012 can demodulate a Walsh Sequence included in the access probe utilizing an FHT. Access determiner 1016 can selectively Grant the one or more mobile devices access to the sector.

Figure 11:
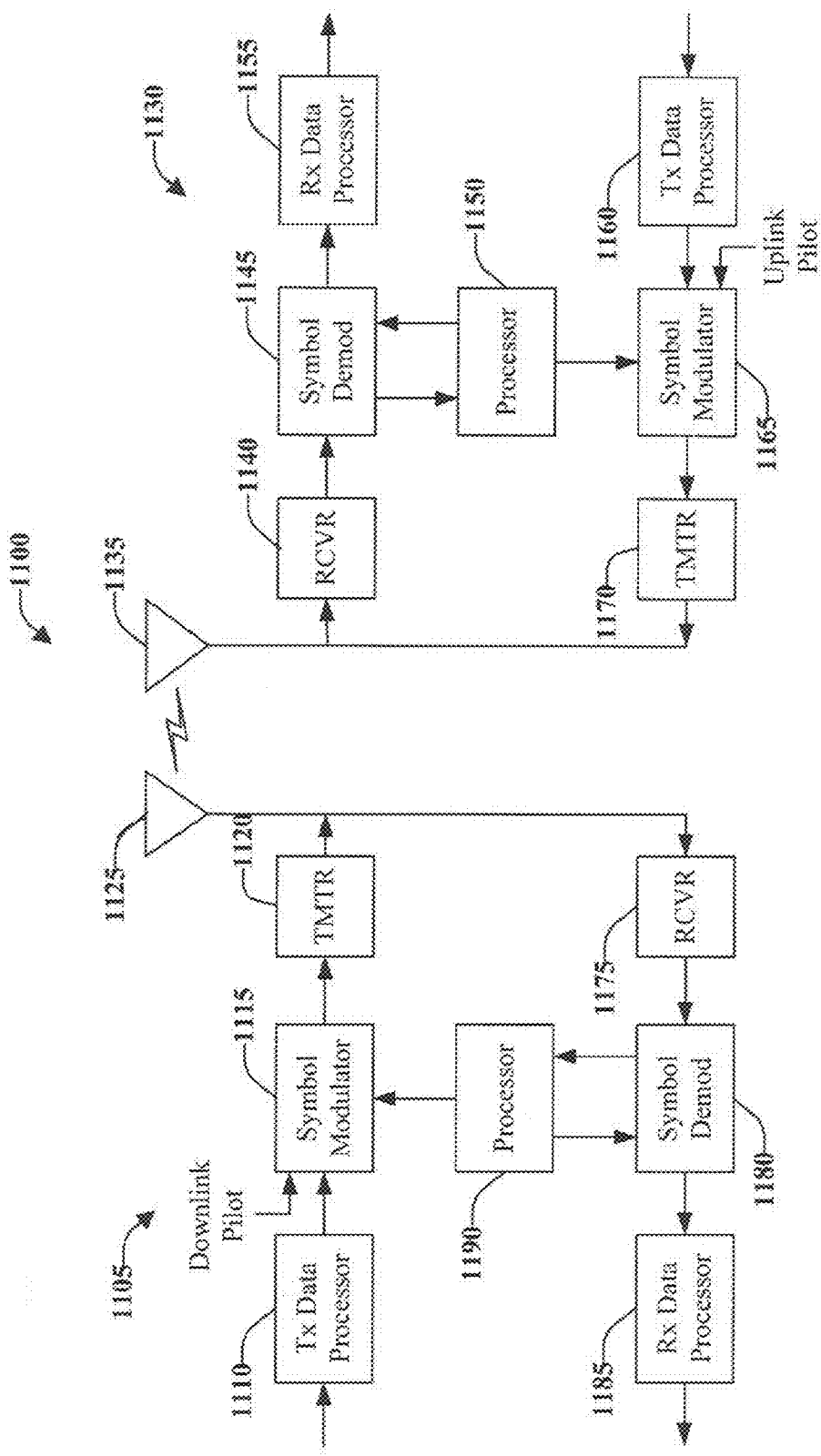
FIG. 11 illustrates an exemplary wireless communication system.

FIG. 11 illustrates an exemplary wireless communication system 1100. Wireless communication system 1100 depicts one base station and one terminal for sake of brevity. However, it is to be appreciated that system 1100 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1115 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 obtains N received symbols and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink.

Processors 1190 and 1150 direct (e.g., control, coordinate, manage, . . . ) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof With software, implementation can be through modules (e.g., procedures, functions, and so on) that perform the functions described herein. The software codes may be stored in memory unit and executed by the processors 1190 and 1150.

It is to be understood that the embodiments described herein may be implemented by hardware, software, firmware, middleware, microcode, or any combination thereof When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

Figure 12:
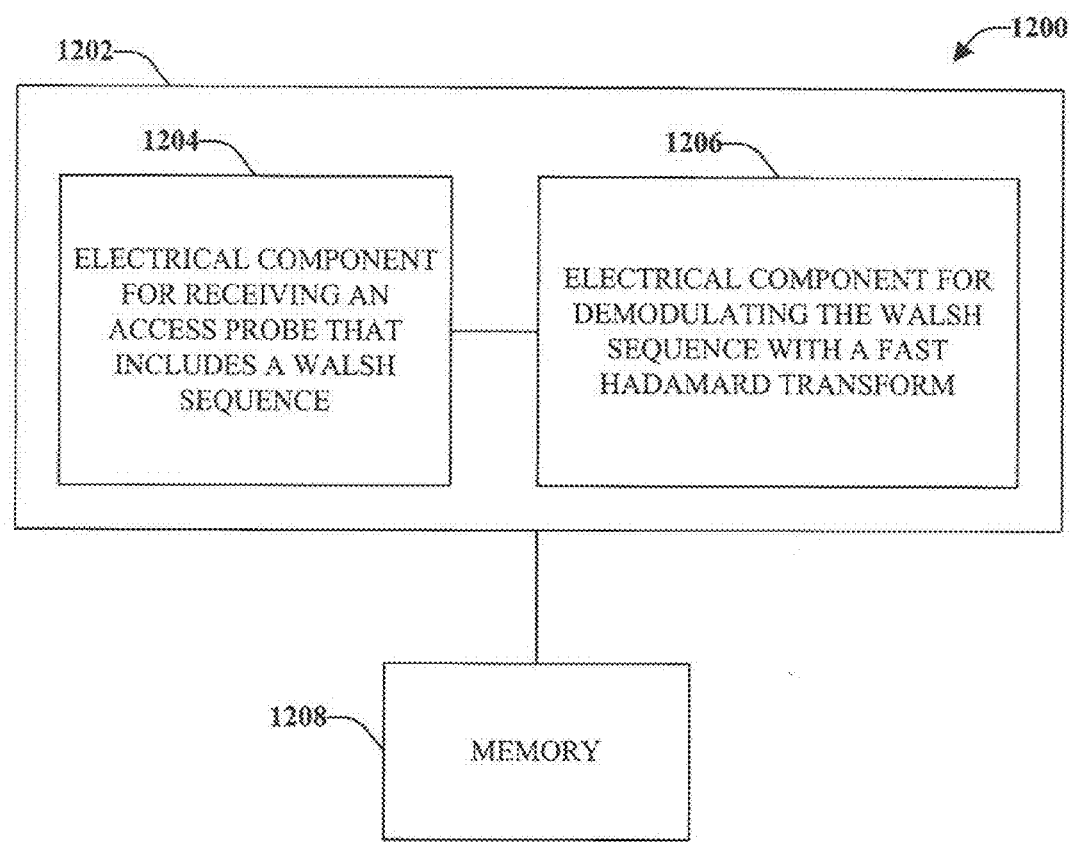
FIG. 12 illustrates a system for using a Fast Hadamard Transform for access-based handoff probes.

With reference to FIG. 12, illustrated is a system 1200 for using a Fast Hadamard Transform for access-based handoff probes. For example, system 1200 can reside at least partially within a base station. It is to be appreciated that system 1200 is represented as including functional blocks, which can be functional blocks that represent functions implemented by a processor, software, or combination thereof (e.g., firmware). System 1200 includes a logical grouping 1202 of electrical components that can act separately or in conjunction. For instance, logical grouping 1202 can include an electrical component for receiving an access probe 1204. The access probe can be received from a mobile device, wherein the mobile device requests access to a serving area. The access probe can include a Walsh Sequence. In accordance with some aspects, the Walsh Sequence can include 1,024 modulation systems.

Further, logical grouping 1202 can comprise an electrical component for demodulating a Walsh Sequence, included in the access probe, with a Fast Hadamard Transform 1206. The Fast Hadamard Transform (FHT) can comprise a random sequence that is common to one or more devices that may transmit access probes.

In accordance with some aspects, system 1200 includes an electrical component for selectively granting the mobile device access to the sector based on the demodulation (not shown). Selectively granting access to the sector can include transmitting an Access Grant over a Shared Signaling MAC Protocol. Additionally or alternatively, system 1200 can include an electrical component for receiving access probes from two or more devices at substantially the same time (not shown). Also included can be an electrical component for demodulating the Walsh Sequences included in the access probes with a Fast Hadamard Transform that comprises the random sequence.

Additionally, system 1200 can include a memory 1208 that retains instructions for executing functions associated with electrical components 1204, 1206, and/or other electrical components. While shown as being external to memory 1208, it is to be understood that one or more of electrical components 1204, 1206 can exist within memory 1208.

Figure 13:
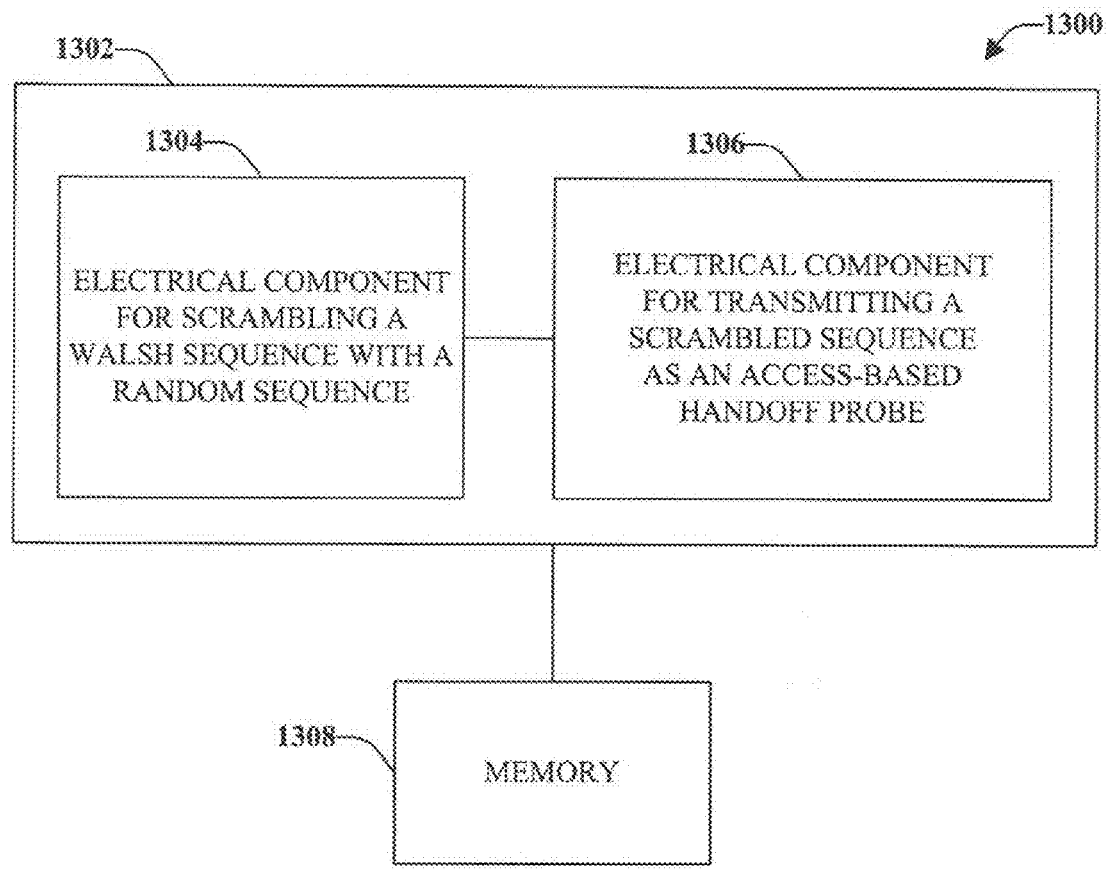
FIG. 13 illustrates a system for using a single Fast Hadamard Transform for access-based handoff probes.

Turning to FIG. 13, illustrated is a system 1300 for using a single Fast Hadamard Transform for access-based handoff probes. System 1300 can reside within an access terminal, for instance. As depicted, system 1300 includes functional blocks that can represent functions implemented by a processor, software, or combination thereof (e.g., firmware). System 1300 includes a logical grouping 1302 of electrical components that can act separately or in conjunction. Logical grouping 1302 can include an electrical component for scrambling a Walsh Sequence with a random sequence to produce a scrambled sequence 1004. The random sequence can be a sequence that was previously communicated to one or more devices. Moreover, logical grouping 1302 can include an electrical component for transmitting the scrambled sequence as an access-based handoff probe 1306. At least one subsequence of the scrambled sequence can be included in the handoff probe.

In accordance with some aspects, logical grouping 1302 can include an electrical component for receiving an Access Grant over a Shared Signaling Mac Protocol (not shown). The Access Grant can be received in response to the transmitted access-based handoff probe.

Additionally, system 1300 can include a memory 1308 that retains instructions for executing functions associated with electrical components 1304, 1306, and/or other components. While shown as being external to memory 1308, it is to be understood that electrical components 1304, 1306 can exist within memory 1308.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for using a single Fast Hadamard Transform for access-based handoff probes, the method comprising:
   scrambling, at a first device, a first Walsh sequence with a random sequence to produce a first scrambled Walsh sequence, the random sequence to be used by a plurality of devices including the first device to scramble Walsh sequences during generation of handoff probes, wherein each of the Walsh sequences is decodable using a single Fast Hadamard Transform (FHT) including the random sequence; and
   transmitting an access-based handoff probe that includes at least a portion of the first scrambled Walsh sequence.

2. The method of claim 1, further comprising receiving an access grant over a shared signaling medium access control protocol in response to the transmitted access-based handoff probe.

3. The method of claim 1, further comprising receiving an assignment of one or more sub-sequences of the first scrambled Walsh sequence at the first device, wherein the portion of the first scrambled Walsh sequence included in the access-based handoff probe corresponds to the one or more sub-sequences.

4. The method of claim 1, wherein the first scrambled Walsh sequence comprises 1,024 modulation symbols.

5. The method of claim 1, further comprising:
   receiving the random sequence at the first device.

6. The method of claim 1, wherein the random sequence is to be used by the plurality of devices during a particular interval, and wherein a second random sequence is to be used by the plurality of devices during a second interval.

7. The method of claim 6, wherein the particular interval is 5 milliseconds.

8. The method of claim 1, wherein the random sequence is based on a transmission time of the access-based handoff probe, a maximum number of devices that can transmit access-based handoff probes at a particular time, or a combination thereof.

9. The method of claim 1, wherein the random sequence is based on a pilot level.

10. A wireless communications apparatus, the apparatus comprising:
    a transmitter; and
    a processor configured to:
        scramble a first Walsh sequence with a random sequence to produce a first scrambled Walsh sequence, the random sequence to be used by a plurality of devices to scramble Walsh sequences during generation of handoff probes, wherein each of the Walsh sequences is decodable using a single Fast Hadamard Transform (FHT) including the random sequence; and
        cause the transmitter to transmit an access-based handoff probe that includes at least a portion of the first scrambled Walsh sequence.

11. The wireless communications apparatus of claim 10, further comprising a receiver configured to:
    receive the random sequence; and
    receive an access grant over a shared signaling medium access control protocol in response to the access-based handoff probe.

12. The wireless communications apparatus of claim 10, further comprising receiving an assignment of one or more sub-sequences of the first scrambled Walsh sequence, wherein the portion of the first scrambled Walsh sequence included in the access-based handoff probe corresponds to the one or more sub-sequences.

13. The wireless communications apparatus of claim 10, wherein the first scrambled Walsh sequence comprises 1,024 modulation symbols.

14. The wireless communications apparatus of claim 10, further comprising a memory configured to store information related the first scrambled Walsh sequence and the access-based handoff probe.

15. A wireless communications apparatus that uses a single Fast Hadamard Transform for access-based handoff probes, the apparatus comprising:
    means for scrambling a first Walsh sequence with a random sequence to produce a first scrambled Walsh sequence, the random sequence to be used by a plurality of devices to scramble Walsh sequences during generation of handoff probes, wherein each of the Walsh sequences is decodable using a single Fast Hadamard Transform (FHT) including the random sequence; and
    means for transmitting an access-based handoff probe that includes at least a portion of the first scrambled Walsh sequence.

16. The wireless communications apparatus of claim 15, further comprising:
    means for receiving the random sequence; and
    means for receiving an access grant over a shared signaling medium access control protocol in response to the transmitted access-based handoff probe.

17. The wireless communications apparatus of claim 15, further comprising means for receiving an assignment of one or more sub-sequences of the first scrambled Walsh sequence, wherein the portion of the first scrambled Walsh sequence included in the access-based handoff probe corresponds to the one or more sub-sequences.

18. The wireless communications apparatus of claim 15, wherein the first scrambled Walsh sequence comprises 1,024 modulation symbols.

19. A non-transitory computer-readable medium comprising instructions that, when executed by a processor, cause the processor to:
    scramble, at a first device, a first Walsh Sequence with a random sequence to produce a first scrambled Walsh sequence, the random sequence to be used by a plurality of devices including the first device to scramble Walsh sequences during generation of handoff probes, wherein each of the Walsh sequences is decodable using a single Fast Hadamard Transform (FHT) including the random sequence; and
    cause a transmitter to transmit an access-based handoff probe that includes at least a portion of the first scrambled Walsh sequence.

20. The non-transitory computer-readable medium of claim 19, wherein the instructions further cause the processor to receive an assignment of one or more sub-sequences of the first scrambled Walsh sequence, wherein the portion of the first scrambled Walsh sequence included in the access-based handoff probe corresponds to the one or more sub-sequences.

* * * * *